US012640977B2

(12) United States Patent
Dwivedi et al.

(10) Patent No.: US 12,640,977 B2
(45) Date of Patent: May 26, 2026

(54) SYSTEMS AND METHODS FOR AUTOMATED CROSS-DOMAIN ROOT CAUSE ANALYSIS

(71) Applicant: Rakuten Symphony, Inc., Tokyo (JP)

(72) Inventors: Abhinav Dwivedi, Indore (IN); Abhishek Gadekar, Indore (IN); Bakir Malak, Indore (IN); Sumanthkumar Laxmirajam Eaga, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 526 days.

(21) Appl. No.: 18/174,070

(22) Filed: Feb. 24, 2023

(65) Prior Publication Data

US 2024/0291707 A1 Aug. 29, 2024

(51) Int. Cl.
H04L 41/0631 (2022.01)
H04L 41/0659 (2022.01)
H04L 41/5009 (2022.01)

(52) U.S. Cl.
CPC ...... H04L 41/0631 (2013.01); H04L 41/0661 (2023.05); H04L 41/5009 (2013.01)

(58) Field of Classification Search
CPC ............. H04L 41/0631; H04L 41/0661; H04L 41/5009
USPC .......................................................... 370/242
See application file for complete search history.

(56) References Cited

U.S. PATENT DOCUMENTS

| | | | | |
|---|---|---|---|---|
| 9,697,103 B2 * | 7/2017 | Wang | .................. | G06F 11/3616 |
| 10,171,335 B2 * | 1/2019 | Maheshwari | ......... | H04L 43/067 |
| 10,812,318 B2 * | 10/2020 | Tammana | ............. | H04L 41/064 |
| 10,812,336 B2 * | 10/2020 | Harneja | ............... | H04L 41/0873 |
| 10,862,738 B2 * | 12/2020 | Tocker | ................... | H04L 41/064 |
| 11,017,298 B2 * | 5/2021 | Cormier | ................... | G06N 5/02 |
| 11,087,263 B2 * | 8/2021 | Boe | .................. | G06Q 10/06393 |
| 11,199,837 B2 * | 12/2021 | Cella | ...................... | G06N 5/046 |
| 11,271,795 B2 * | 3/2022 | Bhalla | ................. | H04L 41/0895 |
| 11,275,775 B2 * | 3/2022 | Fletcher | .............. | H04L 41/5032 |
| 11,343,150 B2 * | 5/2022 | Harneja | ............... | H04L 41/145 |
| 11,431,550 B2 * | 8/2022 | Zafer | ................. | H04L 41/0654 |

(Continued)

FOREIGN PATENT DOCUMENTS

| | | | | | | |
|---|---|---|---|---|---|---|
| CN | | 114024837 A | * | 2/2022 | ............. | H04L 41/12 |
| CN | | 116866149 A | * | 10/2023 | ......... | H04L 41/0631 |

(Continued)

*Primary Examiner* — Melvin H Pollack
(74) *Attorney, Agent, or Firm* — Sughrue Mion, PLLC

(57) ABSTRACT

A method of performing cross-domain root cause analysis (RCA) includes determining whether a node of a parent domain violates a predefined parent domain condition, based on determining that the node of the parent domain violates the predefined parent domain condition, determining whether a node of at least one child domain violates a predefined child domain condition, the at least one child domain being interconnected with the parent domain that violates the predefined parent domain condition, based on determining that the node of the at least one child domain violates the predefined child domain condition, performing at least one corrective action on the at least one child domain, and based on determining that the node of the at least one child domain does not violate the predefined child domain condition, performing at least one corrective action on the parent domain that violates the predefined parent domain condition.

20 Claims, 4 Drawing Sheets

(56)                References Cited

U.S. PATENT DOCUMENTS

| | | | | |
|---|---|---|---|---|
| 11,496,353 | B2 * | 11/2022 | Chandrasekhar | ... H04L 41/0823 |
| 11,501,238 | B2 * | 11/2022 | Fletcher | ........... G06Q 10/06393 |
| 11,539,590 | B2 * | 12/2022 | Anwer | .................... H04L 41/16 |
| 11,593,029 | B1 * | 2/2023 | Dhuse | ................ G06F 11/3006 |
| 11,599,407 | B2 * | 3/2023 | Haines | ............... G06F 16/2379 |
| 11,604,502 | B2 * | 3/2023 | Menzel | ..................... G06F 1/28 |
| 11,620,203 | B2 * | 4/2023 | Larkin | ................. G06F 11/324 |
| | | | | 717/127 |
| 11,627,033 | B2 * | 4/2023 | Umakanth | ........... H04L 41/064 |
| | | | | 709/224 |
| 11,645,131 | B2 * | 5/2023 | Monk | ................ G06F 11/0712 |
| | | | | 714/57 |
| 11,668,764 | B2 * | 6/2023 | Menzel | ................. G05B 19/00 |
| | | | | 702/58 |
| 11,716,372 | B2 * | 8/2023 | Toth | ........................ H04W 4/40 |
| | | | | 709/203 |
| 11,853,777 | B2 * | 12/2023 | Cheriton | .............. G06F 9/4494 |
| 11,886,155 | B2 * | 1/2024 | Nixon | ................ G05B 19/4185 |
| 11,894,969 | B2 * | 2/2024 | Barber | ................... H04L 41/00 |
| 11,929,899 | B2 * | 3/2024 | Abidi | ................. H04L 41/5019 |
| 12,072,784 | B2 * | 8/2024 | Dupont | ............... G06F 11/3048 |
| 12,309,182 | B1 * | 5/2025 | McAleer | ................. G06F 9/455 |
| 12,333,579 | B2 * | 6/2025 | Null | ....................... G06F 16/901 |
| 2016/0072688 | A1 * | 3/2016 | Desai | ................. H04L 41/0659 |
| | | | | 709/224 |
| 2018/0270114 | A1 * | 9/2018 | Indiresan | ............ H04L 41/0883 |
| 2018/0316594 | A1 * | 11/2018 | Wu | ......................... H04L 45/64 |
| 2022/0078071 | A1 * | 3/2022 | Agapitos | ................ H04L 41/16 |
| 2022/0108262 | A1 * | 4/2022 | Cella | ...................... G05B 17/02 |
| 2022/0294816 | A1 * | 9/2022 | Martin | ................. H04L 67/535 |
| 2023/0010111 | A1 * | 1/2023 | Rahman | ............. H04L 41/0836 |
| 2023/0189382 | A1 * | 6/2023 | Haustein | .............. H04W 76/20 |
| | | | | 370/329 |
| 2024/0056346 | A1 * | 2/2024 | Leask | ................ H04L 41/0654 |
| 2024/0259879 | A1 * | 8/2024 | Ranganath | ......... H04L 41/5054 |

FOREIGN PATENT DOCUMENTS

| | | | | | |
|---|---|---|---|---|---|
| JP | | 2014119982 | A * | 6/2014 | |
| WO | WO-2023073859 | A1 * | 5/2023 | ............. | G06F 11/30 |
| WO | WO-2025013004 | A1 * | 1/2025 | ........ | H04L 41/5074 |

* cited by examiner

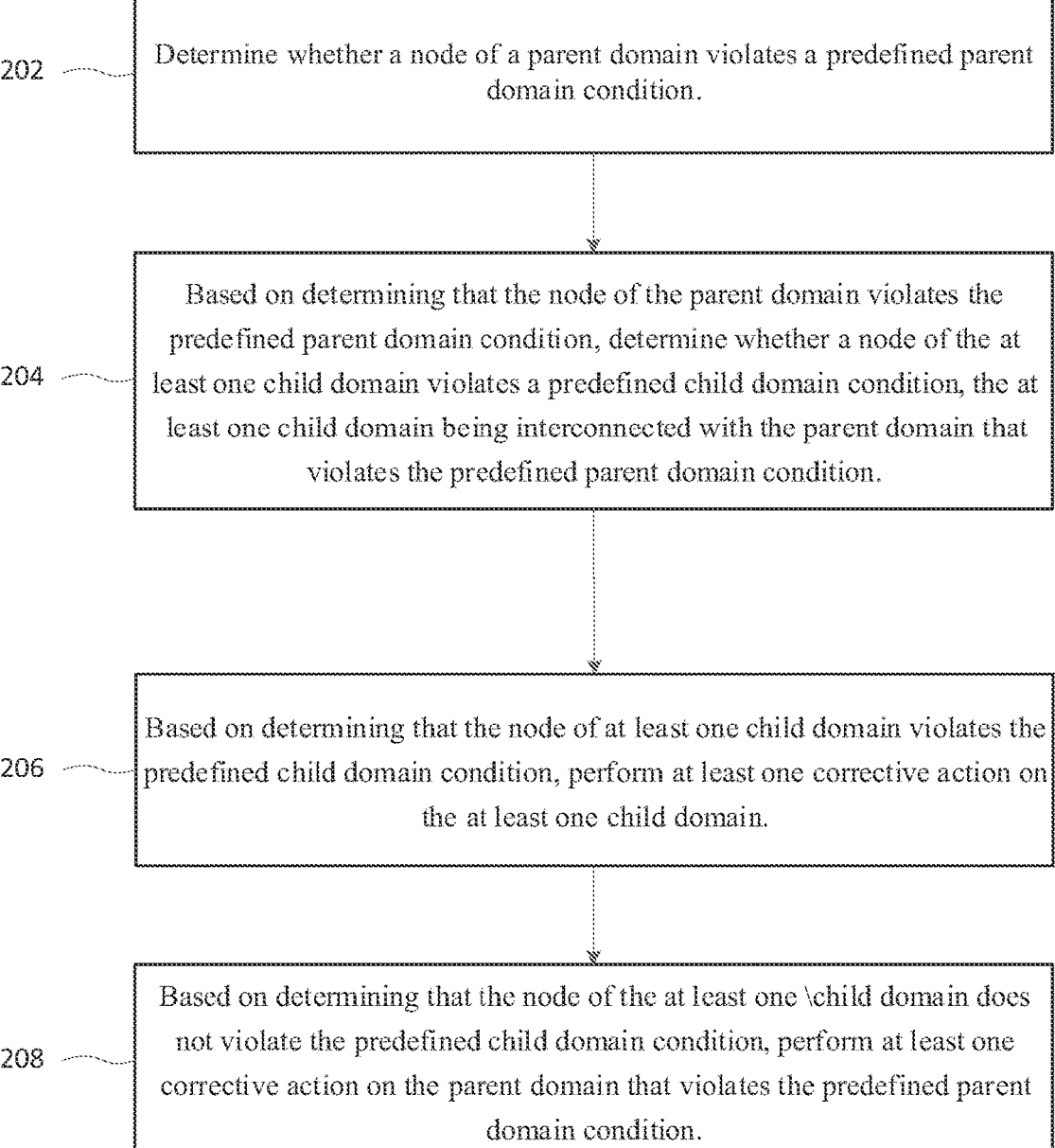

202 — Determine whether a node of a parent domain violates a predefined parent domain condition.

204 — Based on determining that the node of the parent domain violates the predefined parent domain condition, determine whether a node of the at least one child domain violates a predefined child domain condition, the at least one child domain being interconnected with the parent domain that violates the predefined parent domain condition.

206 — Based on determining that the node of at least one child domain violates the predefined child domain condition, perform at least one corrective action on the at least one child domain.

208 — Based on determining that the node of the at least one \child domain does not violate the predefined child domain condition, perform at least one corrective action on the parent domain that violates the predefined parent domain condition.

FIG. 2

SYSTEMS AND METHODS FOR AUTOMATED CROSS-DOMAIN ROOT CAUSE ANALYSIS

1. FIELD

Apparatuses and methods consistent with example embodiments of the present disclosure relate to root cause analysis (RCA) in environments with multiple domains.

2. DESCRIPTION OF RELATED ART

In related art, a user of a network may be required to monitor different or multiple domains separately, and then the user may manually analyze the domains to identify inter-connected node dependency and performance.

Thus, in the related art, manually and individually setting rules and analyzing each domain is time consuming and requires a significant amount of manual effort. Furthermore, the related art does not provide any centralized technique or solution to monitor interconnected modes from different domains of a wireless network.

SUMMARY

According to embodiments, systems and methods are provided for automated monitoring a network environment including nodes of child domains interconnected with a parent domain.

According to an aspect of the disclosure, a method of performing cross-domain root cause analysis (RCA) may include determining whether a node of a parent domain violates a predefined parent domain condition, based on determining that the node of the parent domain violates the predefined parent domain condition, determining whether a node of at least one child domain violates a predefined child domain condition, the at least one child domain being interconnected with the parent domain that violates the predefined parent domain condition, based on determining that the node of the at least one child domain violates the predefined child domain condition, performing at least one corrective action on the at least one child domain, and based on determining that the node of the at least one child domain does not violate the predefined child domain condition, performing at least one corrective action on the parent domain that violates the predefined parent domain condition.

According to an aspect of the disclosure, a system for performing cross-domain RCA may include at least one memory configured to store instructions and at least one processor configured to execute the instructions to determine whether a node of a parent domain violates a predefined parent domain condition, based on determining that the node of the parent domain violates the predefined parent domain condition, determine whether a node of at least one child domain violates a predefined child domain condition, the at least one child domain being interconnected with the parent domain that violates the predefined parent domain condition, based on determining that the node of the at least one child domain violates the predefined child domain condition, perform at least one corrective action on the at least one child domain, and based on determining that the node of the at least one child domain does not violate the predefined child domain condition, perform at least one corrective action on the parent domain that violates the predefined parent domain condition.

According to an aspect of the disclosure, a non-transitory computer-readable storage medium may store instructions that, when executed by at least one processor, cause the at least one processor to determine whether a node of a parent domain violates a predefined parent domain condition, based on determining that the node of the parent domain violates the predefined parent domain condition, determine whether a node of at least one child domain violates a predefined child domain condition, the at least one child domain being interconnected with the parent domain that violates the predefined parent domain condition, based on determining that the node of the at least one child domain violates the predefined child domain condition, perform at least one corrective action on the at least one child domain, and based on determining that the node of the at least one child domain does not violate the predefined child domain condition, perform at least one corrective action on the parent domain that violates the predefined parent domain condition.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 2 is a flowchart of a method of cross-domain RCA, according to an embodiment;

DETAILED DESCRIPTION

Figure 1:
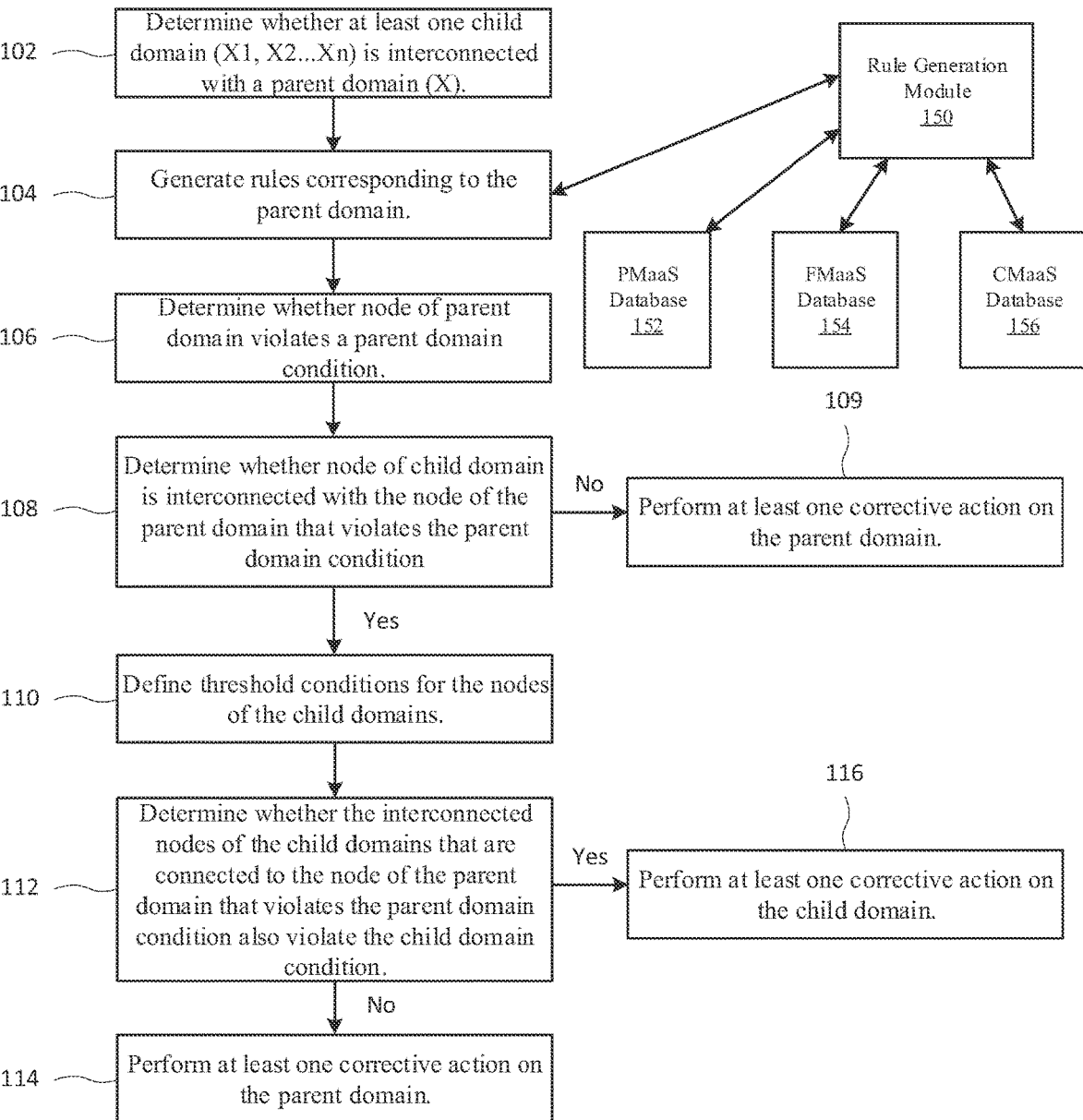
FIG. 1 is a diagram of operations of cross-domain root cause analysis (RCA), according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which cross-domain root cause analysis (RCA) is performed. The system may determine whether at least one child domain is connected to a parent domain, determine whether a node of a parent domain violates a predefined parent domain condition, based on determining that the node of the parent domain violates the predefined parent domain condition, determine whether a node of the at least one child domain violates a predefined child domain threshold condition, and based on determining that the node of at least one child domain violates the predefined child domain threshold condition, perform at least one corrective action on the at least one child domain and/or the parent domain.

That is, the systems and methods disclosed herein may operate within a network environment where a parent domain exists, and one or more child domains may be interconnected with the parent domain, such that performance degradation of the one or more child domains may negatively impact performance of the parent domain. Thus, the provided systems and methods may implement a single rule generation module, as opposed to implementing a plurality of rule generation modules (e.g., watchtower modules) where each of the rule generation modules corresponds to either the parent domain or the one or more child domains. The provided systems and methods may identify a parent domain and then identify whether child domains are interconnected with the parent domain. Then, the provided systems and methods may generate (e.g., by a user based on key performance indicators (KPI) or other data described below), with the rule generation module, a parent domain condition and child domain threshold conditions for the child domains interconnected with the parent domain (the child domain threshold conditions may be determined based on the parent domain condition). Then, through an automated process, the systems and methods may determine whether the parent domain violates the parent domain condition, and based on the parent domain condition being violated, determine whether child domain threshold condition is violated. When the child domain threshold condition is violated, the system may perform corrective actions on the child domain (e.g., on a node of the child domain), as well as on the parent domain, if needed. When the child domain threshold condition is not violated, the system may perform corrective actions on the parent domain (e.g., on a node of the parent domain).

Thus, the systems and methods provide an automated RCA procedure on parent domains as well as child domains that are interconnected with parent domains without requiring individual monitoring of each child domain with separate rule generation modules for each domain, thereby reducing the amount of manual effort required for such RCA performance techniques while improving the overall functionality and reliability of the network in which the parent and child domains are implemented. That is, by combining multiple rule generation modules or by combining the functionality of multiple rule generation modules for parent domains and child domains into combined modules, interconnected domains may be monitored. In other words, as opposed to being required to monitor a parent domain and a child domain separately, and then attempting to find rule violations based on the individual and independent monitoring through manual data correlation (which is very time consuming and unreliable), the systems and methods provided herein allow for interconnected domains to a parent domain to be monitored in conjunction with the parent domain, allowing for faster, easier, and more reliable rule violation detection. Furthermore, the systems and methods may provide an interface where multiple rule generation modules may be combined into a single operational interface. That is, the systems and methods may combine multiple parent/child domain monitoring systems into a single system that monitors parent/child domains based on rules violations, reducing the amount of effort and hardware required for such systems and methods. Additionally, the systems and methods may provide a quasi-automated process for monitoring domains. That is, instead of generating reports and manually identifying parent or child domains that require corrective actions, the systems and methods may automatically monitor parent domains and determined interconnected child domains in response to a rule violation, rather than having to later determine rule violations via reports (e.g., determining rules violations manually in a slow and inefficient manner). Thus, the systems and methods disclosed herein for monitoring of interconnected nodes from different domains (e.g., with closed loop functionality) provide a simplified process which reduces manual intervention in monitoring network performance through an end-to-end automation process with identification of dependencies in the network across multiple domains.

FIG. 1 is a diagram of operations of cross-domain RCA, according to an embodiment. As used herein, the term node may refer to any network element, such as a switch, antenna, router, and other network elements as will be understood by one of ordinary skill in the art from the disclosure herein. As used herein, the term domain may refer to sub-categories of the network, such as the radio access network (RAN) domain, transport domain, core domain, etc. The RAN domain may refer to the devices installed at the top of a tower (e.g., a service providing tower) that are configured to provide network coverage. A transport domain may include devices connected with routers or other components where data travels in packets. A core domain may include devices that are installed in a data center or server. In example embodiments, the RAN domain may correspond to a parent domain, and the transport domain and core domain may correspond to child domains. Further, the parent domain may include a transport domain, and the child domains may include the RAN domain and the core domain. Still further, the parent domain may include a core domain and the child domains may include the RAN domain and core domain. In other example embodiments, multiple parent domains of various types may include multiple interconnected child domains of various types. Other domain correspondences and combinations will be understood by one of ordinary skill in the art from the disclosure herein.

In operation 102, the system may determine whether at least one child domain is interconnected with a parent domain. For example, X may refer to a parent domain, and X1, X2, . . . Xn may refer to child domains that are interconnected with the parent domain (X1 and X2 are used to refer to the child domains for ease of description). That is, in an embodiment, X may refer to the RAN domain, X1 may refer to a transport domain, and X2 may refer to a core domain. In some embodiments, the system may be provided with information prior to this operation indicating that various child domains are interconnected with a parent domain. Furthermore, the system may determine whether nodes of the child domains are interconnected with nodes of the parent domain, although this may be performed later after it is determined that a node of a parent domain violates a parent domain condition. Additionally, the interconnected nodes between multiple domains may be identified from nodes of the parent domain that violate configured rules (see operation 104), and the identification may be performed with the assistance of topology application programming interfaces (API), which may assist a user to create rules when searching APIs, and the topology API may fetch data of the interconnected nodes of the transport domain/core domain, which may be collected and used to determine, for example by the rules generation module or other system components (or by a user), whether rules are violated by the domains. That is, a user may select various threshold conditions to determine whether the threshold conditions have been violated, and then the system may retrieve and utilize system data from the topology API (e.g., based on parameters from a user input) to determine whether the threshold conditions are satisfied or violated.

Operation 102 may be performed as an initialization operation such that the system may determine all interconnectivity between parent and child domains prior to any rule violation. As such, operation 102 may be omitted based on previous system configurations or based on overall system functionality (i.e., the system may be configured to determine child interconnectivity to a parent domain in response to a rule violation by the parent domain, such as in operation 108, without operation 102 being performed).

In operation 104, the system, via a rule generation module 150 (e.g., a watchtower module) may generate rules corresponding to the parent domain. In an example embodiment, the system may generate rules corresponding to the parent domain only, and then, based on determining that the parent domain (or node of a parent domain) violates a rule(s), the system may then generate rules for child domains interconnected with the parent domain (e.g., operation 110). Alternatively, in operation 104, the rules for the parent domain and the rules for the child domains may be generated.

In particular, the rules may correspond to a parent domain condition (e.g., a parent domain threshold condition) and a child domain condition (e.g., a child domain threshold conditions). The parent/child domain threshold conditions may be conditions upon which it is determined whether an issue with a node exists (i.e., when a node violates a predefined condition, the system may perform full RCA). The rules may be generated by a user (e.g., manually or automatically based on preset parameters) or automatically based on system parameters. The rules may be generated based on the domain type, the domain vendor, the node type, alarm type (e.g., outage alarm, weak signal alarm, etc.), issue severity, a frequency of occurrence of a particular issue (e.g., a number of times a KPI threshold is violated within a predetermined time frame), device availability KPIs, etc.

For example the rule generation module 150 may access a performance management as a service (PMaaS) database 152 to obtain KPI data for setting predefined conditions based on KPI threshold values, a fault management as a service (FMaaS) database 154 to obtain fault management data, and/or a configuration management as a service (CMaaS) database 156 to obtain configuration management data. That is, the rule generation module 150 may generate the predefined conditions based on KPI data, fault management data, and/or configuration management data. The system may identify issues/hurdles within the network based on the KPI data, fault management data, and/or configuration management data, and then may define rules based on the identified issues/hurdles. The system may first define rules for the parent domain, such as the RAN domain, and then define rules associated with other nodes from the child domains, such as the transport domain and/or core domain.

Additionally, the system may define rules based on vendor specific applications. That is, the system may identify a specific vendor to which rules should be applied, obtain data from the databases 152-156 particular to the specific vendor, and then define rules for the parent domain and subsequently the child domains for implementation only with a specific vendor. In other words, based on the specific vendor, the system may only identify domains corresponding to the specific vendor, and data metrics (e.g., KPI values) that are only generated by the specific vendor. The system may also generate rules based on different data aggregation levels. That is, the system may be configured to aggregate data (e.g., store data in the databases 152-156) at specific intervals (e.g., daily, hourly, quarterly, etc.) for monitoring the performance of the network (and the domains/nodes), and then rules may be generated in accordance with the data aggregation scheduling (e.g., the system may be configured to generate the rules at intervals corresponding to when the data in the databases 152-156 is updated). The system may also generate rules (e.g., the same rules) for different domains, different technologies, different nodes, etc., for each network element or geographical level. Furthermore, the rules of the child domains may be generated based on the rules of the parent domain. That is, the rule for the child domain (e.g., a child domain KPI value threshold) may be the same or at least generated based on the rule for the parent domain (e.g., a parent domain KPI value threshold).

Furthermore, the system may provide an interface for a user to define multiple rules within a single rule generation module. That is, a user, via the interface provided by the system, may define multiple parent domain rules and multiple child domain rules for monitoring the domains within a single rule generation module and/or interface. Additionally, in operation 104, the system may only generate rules for monitoring the parent domains, and then, based on determining a violation of the parent domain rule(s), the system may then generate rules for the child domains, and the rules for the child domain may be generated based on the violated rule of the parent domain. For example, if no child domain rules are defined, and a parent domain rule is defined as a KPI threshold being less than 100, in response to the parent domain rule being violated, the system may generate a child domain rule based on similar metrics, such as a specific child domain KPI threshold that, if violated, would cause the parent domain to violate the initial parent domain rule.

In operation 106, the system may determine whether a node of the parent domain violates a parent domain condition. That is, the system may determine whether a node of domain X violates a parent domain condition generated in operation 104.

Based on determining that a node of the parent domain violates a parent domain condition, in operation 108, the system may determine whether a node of a child domain is interconnected with the node of the parent domain that violates the parent domain condition. In some embodiments, the node connectivity is determined in operation 102 and in such embodiments, operation 108 may be omitted. In other embodiments, the parent domains and interconnected child domains are determined in operation 102, and in operation 108, the system specifically determines the particular nodes of the child domain that are interconnected with the node of the parent domain that violates the parent domain condition. In particular, the system may determine whether nodes of domains X1 and/or X2 are interconnected with the node of the parent domain that violates the parent domain condition. Based on determining that no child domain/node of a child domain are interconnected with the violating parent domain, in operation 109, the system may perform at least one corrective action on the parent domain.

In operation 110, the system may define threshold conditions for the nodes of the child domains. The threshold conditions may correspond to the child domain conditions. That is, the system may define threshold conditions, such as KPI value thresholds, for the nodes of the X1 domain and the nodes of the X2 domain that are interconnected with the node of the parent domain that violates the parent domain condition. In some embodiments, the threshold conditions for the nodes of the child domains are determined in operation 104 and in such embodiments, operation 110 may be omitted. The system may also define threshold conditions for the nodes of the child domains prior to determining that a parent domain violates a parent domain condition. That is, the child domain threshold conditions may be predefined in the system prior to detecting rule violations by parent domains.

In operation 112, the system may determine whether the interconnected nodes of the child domains (e.g., the X1 and X2 domains) that are connected to the node of the parent domain that violates the parent domain condition (i.e., the rule) also violate the child domain condition. The child domain condition may be the same as or different from the parent domain condition. The child domain condition may be generated based on the parent domain condition (e.g., if the parent domain condition is a KPI value threshold of 100, the child domain condition may be a subset of the KPI threshold value).

Based on determining that the interconnected nodes of the child domains (e.g., X1 and X2) do not violate the child domain condition, in operation 114, the system may perform at least one corrective action on the parent domain. The at least one corrective action may include generating and transmitting, to a user capable of performing corrective actions and, in some embodiments, via the rule generation module 105, an alert indicating that the parent domain condition is violated, such as an email notification, text notification, push notification, etc. The at least one corrective action may include executing a resolution method of procedure (RMOP) on the parent domain (e.g., via an automation studio). The at least one corrective action may include changing configuration parameters (in the CMaaS database 156) corresponding to the parent domain condition.

Based on determining that the interconnected nodes of the child domains (e.g., X1 and X2) violate the child domain condition, in operation 116, the system may perform at least one corrective action on the child domain. The at least one corrective action may include generating and transmitting, to a user capable of performing corrective actions and, in some embodiments, via the rule generation module 105, an alert indicating that the child domain condition is violated, such as an email notification, text notification, push notification, etc. The at least one corrective action may include executing a resolution method of procedure (RMOP) on the child domain (e.g., via an automation studio). The at least one corrective action may include changing configuration parameters (in the CMaaS database 156) corresponding to the child domain condition.

Following operations 114 or 116, the system may resume network monitoring of the domains and nodes. The domains and nodes may be monitored via the RCA tree, and may further be monitored by defining thresholds (i.e., other than the parent/child domain conditions) indicating that the network should be monitored (i.e., the system may not monitor the network until a predefined threshold condition for monitoring is met). The system may further monitor the parent domain through the child domains.

FIG. 2 is a flowchart of a method of cross-domain RCA, according to an embodiment. In operation 202, the system may determine whether a node of a parent domain violates a predefined parent domain condition. In operation 204, the system may, based on determining that the node of the parent domain violates the predefined parent domain condition, determine whether a node of the at least one child domain violates a predefined child domain condition, the at least one child domain being interconnected with the parent domain that violates the predefined parent domain condition. In operation 206, the system may, based on determining that the node of at least one child domain violates the predefined child domain condition, perform at least one corrective action on the at least one child domain. In operation 208, the system may, based on determining that the node of the at least one child domain does not violate the predefined child domain condition, perform at least one corrective action on the parent domain that violates the predefined parent domain condition.

The parent domain may include a RAN domain, and the at least one child domain may include a transport domain and/or a core domain. The predefined parent domain condition may be generated based on at least one KPI obtained from a PMaaS database. The predefined parent domain condition may be further generated based on at least one of fault alert information obtained from an FMaaS database, and configuration parameter information obtained from a CMaaS database. The predefined child domain condition may be generated based on the predefined parent domain condition. Performing the at least one corrective action on the at least one child domain may include at least one of generating and transmitting, to a user capable of performing corrective actions, an alert indicating that the predefined child domain condition is violated, executing a RMOP on the at least one child domain, and changing configuration parameters corresponding to at least one of the predefined parent domain condition and the predefined child domain condition. Determining whether the node of the parent domain violates the predefined parent domain condition may include monitoring the parent domain through the at least one child domain and identifying that the node of the parent domain violates the predefined parent domain condition based on monitoring the parent domain through the at least one child domain. The determining whether the node of the at least one child domain violates the predefined child domain condition may be performed based on a topology API corresponding to the parent domain. Based on determining that the node of the parent domain violates the predefined parent domain condition and prior to determining whether the node of the at least one child domain violates the predefined child domain condition, the system may determine whether at least one child domain is interconnected with the parent domain that violates the predefined parent domain condition, and based on determining that no child domain is interconnected with the parent domain that violates the predefined parent domain condition, the system may perform at least one corrective action on the parent domain that violates the predefined parent domain condition. The node of the parent domain may include at least one of a router, an antenna, and a switch, and the node of the at least one child domain may include at least one of a router, an antenna, and a switch.

Thus, the example embodiments disclosed herein for monitoring of interconnected nodes from different domains (e.g., with closed loop functionality) provide a simplified process which reduces manual intervention in monitoring network performance through an end-to-end automation process with identification of dependencies in the network across multiple domains.

Figure 3:
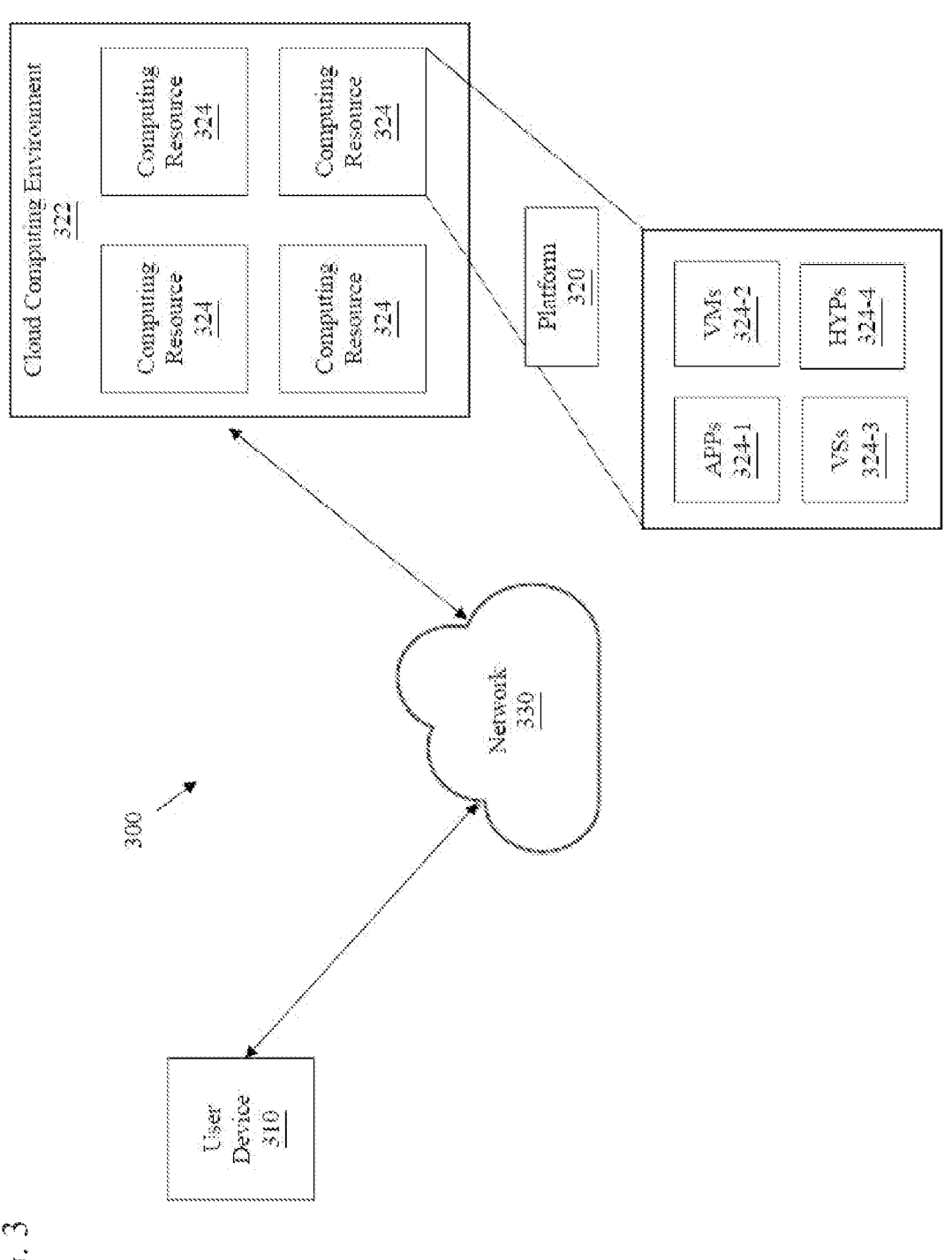
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include a user device 310, a platform 320, and a network 330. Devices of environment 300 may interconnect via wired connections, wireless connections, or a combination of wired and wireless connections. In embodiments, any of the functions and operations described with reference to FIG. 1 above may be performed by any combination of elements illustrated in FIG. 3.

User device 310 includes one or more devices capable of receiving, generating, storing, processing, and/or providing information associated with platform 320. For example, user device 310 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 310 may receive information from and/or transmit information to platform 320.

Platform 320 includes one or more devices capable of receiving, generating, storing, processing, and/or providing information. In some implementations, platform 320 may include a cloud server or a group of cloud servers. In some implementations, platform 320 may be designed to be modular such that certain software components may be swapped in or out depending on a particular need. As such, platform 320 may be easily and/or quickly reconfigured for different uses.

In some implementations, as shown, platform 320 may be hosted in cloud computing environment 322. Notably, while implementations described herein describe platform 320 as being hosted in cloud computing environment 322, in some implementations, platform 320 may not be cloud-based (i.e., may be implemented outside of a cloud computing environment) or may be partially cloud-based.

Cloud computing environment 322 includes an environment that hosts platform 320. Cloud computing environment 322 may provide computation, software, data access, storage, etc. services that do not require end-user (e.g., user device 310) knowledge of a physical location and configuration of system(s) and/or device(s) that hosts platform 320. As shown, cloud computing environment 322 may include a group of computing resources 324 (referred to collectively as "computing resources 324" and individually as "computing resource 324").

Computing resource 324 includes one or more personal computers, a cluster of computing devices, workstation computers, server devices, or other types of computation and/or communication devices. In some implementations, computing resource 324 may host platform 320. The cloud resources may include compute instances executing in computing resource 324, storage devices provided in computing resource 324, data transfer devices provided by computing resource 324, etc. In some implementations, computing resource 324 may communicate with other computing resources 324 via wired connections, wireless connections, or a combination of wired and wireless connections.

As further shown in FIG. 3, computing resource 324 includes a group of cloud resources, such as one or more applications ("APPs") 324-1, one or more virtual machines ("VMs") 324-2, virtualized storage ("VSs") 324-3, one or more hypervisors ("HYPs") 324-4, or the like.

Application 324-1 includes one or more software applications that may be provided to or accessed by user device 310. Application 324-1 may eliminate a need to install and execute the software applications on user device 310. For example, application 324-1 may include software associated with platform 320 and/or any other software capable of being provided via cloud computing environment 322. In some implementations, one application 324-1 may send/receive information to/from one or more other applications 324-1, via virtual machine 324-2.

Virtual machine 324-2 includes a software implementation of a machine (e.g., a computer) that executes programs like a physical machine. Virtual machine 324-2 may be either a system virtual machine or a process virtual machine, depending upon use and degree of correspondence to any real machine by virtual machine 324-2. A system virtual machine may provide a complete system platform that supports execution of a complete operating system ("OS"). A process virtual machine may execute a single program, and may support a single process. In some implementations, virtual machine 324-2 may execute on behalf of a user (e.g., user device 310), and may manage infrastructure of cloud computing environment 322, such as data management, synchronization, or long-duration data transfers.

Virtualized storage 324-3 includes one or more storage systems and/or one or more devices that use virtualization techniques within the storage systems or devices of computing resource 324. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 324-4 may provide hardware virtualization techniques that allow multiple operating systems (e.g., "guest operating systems") to execute concurrently on a host computer, such as computing resource 324. Hypervisor 324-4 may present a virtual operating platform to the guest operating systems, and may manage the execution of the guest operating systems. Multiple instances of a variety of operating systems may share virtualized hardware resources.

Network 330 includes one or more wired and/or wireless networks. For example, network 330 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
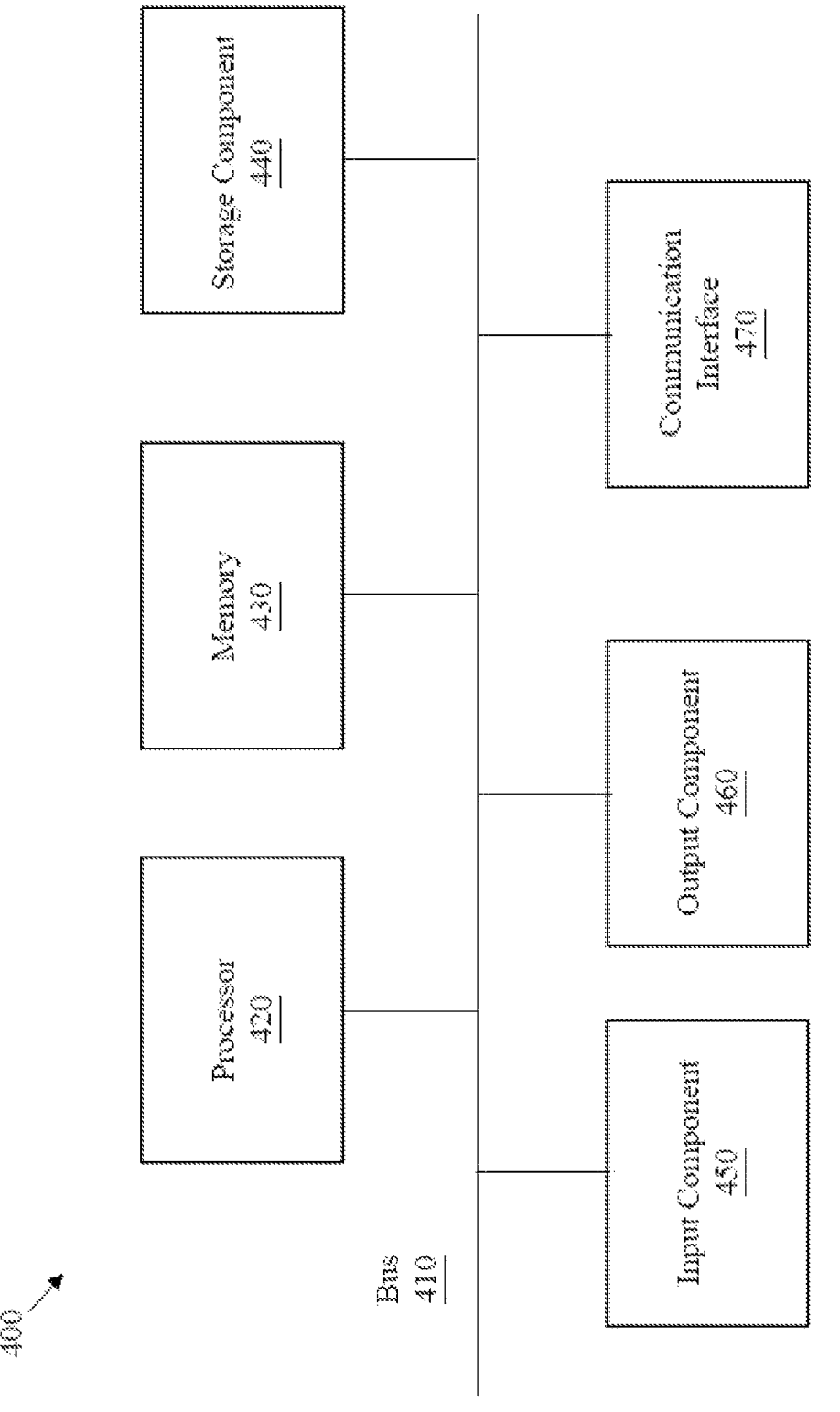
FIG. 4 is a diagram of example components of a device according to an embodiment.

FIG. 4 is a diagram of example components of a device 400. Device 400 may correspond to user device 310 and/or platform 320. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 may be implemented in hardware, firmware, or a combination of hardware and software. Processor 420 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator).

Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

In embodiments, any one of the operations or processes of FIGS. 1-2 may be implemented by or using any one of the elements illustrated in FIGS. 3 and 4.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of performing cross-domain root cause analysis (RCA), the method comprising:
  determining whether a node of a parent domain violates a predefined parent domain condition;
  based on determining that the node of the parent domain violates the predefined parent domain condition, determining whether a node of at least one child domain violates a predefined child domain condition, the at least one child domain being interconnected with the parent domain that violates the predefined parent domain condition;

based on determining that the node of the at least one child domain violates the predefined child domain condition, performing at least one corrective action on the at least one child domain; and based on determining that the node of the at least one child domain does not violate the predefined child domain condition, performing at least one corrective action on the parent domain that violates the predefined parent domain condition.

2. The method of claim 1, wherein the parent domain comprises one of a radio access network (RAN) domain, a transport domain and a core domain, and wherein the at least one child domain comprises another of the RAN domain, the transport domain and the core domain.

3. The method of claim 1, wherein the predefined parent domain condition is generated based on at least one key performance indicator (KPI) obtained from a performance management as a service (PMaaS) database.

4. The method of claim 3, wherein the predefined parent domain condition is further generated based on at least one of:

fault alert information obtained from a fault management as a service (FMaaS) database; and configuration parameter information obtained from a configuration management as a service (CMaaS) database.

5. The method of claim 1, wherein the predefined child domain condition is generated based on the predefined parent domain condition.

6. The method of claim 1, wherein performing the at least one corrective action on the at least one child domain comprises at least one of:

generating and transmitting, to a user capable of performing corrective actions, an alert indicating that the predefined child domain condition is violated;

executing a resolution method of procedure (RMOP) on the at least one child domain; and changing configuration parameters corresponding to at least one of the predefined parent domain condition and the predefined child domain condition.

7. The method of claim 1, further comprising, based on determining that the node of the parent domain violates the predefined parent domain condition and prior to determining whether the node of the at least one child domain violates the predefined child domain condition:

determining whether at least one child domain is interconnected with the parent domain that violates the predefined parent domain condition; and based on determining that no child domain is interconnected with the parent domain that violates the predefined parent domain condition, performing at least one corrective action on the parent domain that violates the predefined parent domain condition.

8. The method of claim 1, wherein the node of the parent domain comprises at least one of a router, an antenna, and a switch, and wherein the node of the at least one child domain comprises at least one of a router, an antenna, and a switch.

9. A system for performing cross-domain root cause analysis (RCA), the system comprising:

at least one memory configured to store instructions; and at least one processor configured to execute the instructions to:

determine whether a node of a parent domain violates a predefined parent domain condition;

based on determining that the node of the parent domain violates the predefined parent domain condition, determine whether a node of at least one child domain violates a predefined child domain condition, the at least one child domain being interconnected with the parent domain that violates the predefined parent domain condition;

based on determining that the node of the at least one child domain violates the predefined child domain condition, perform at least one corrective action on the at least one child domain; and based on determining that the node of the at least one child domain does not violate the predefined child domain condition, perform at least one corrective action on the parent domain that violates the predefined parent domain condition.

10. The system of claim 9, wherein the parent domain comprises one of a radio access network (RAN) domain, a transport domain and a core domain, and wherein the at least one child domain comprises another of the RAN domain, the transport domain and the core domain.

11. The system of claim 9, wherein the predefined parent domain condition is generated based on at least one key performance indicator (KPI) obtained from a performance management as a service (PMaaS) database.

12. The system of claim 11, wherein the predefined parent domain condition is further generated based on at least one of:

fault alert information obtained from a fault management as a service (FMaaS) database; and configuration parameter information obtained from a configuration management as a service (CMaaS) database.

13. The system of claim 9, wherein the predefined child domain condition is generated based on the predefined parent domain condition.

14. The system of claim 9, wherein the at least one processor is further configured to execute the instructions to perform the at least one corrective action on the at least one child domain by, at least one of:

generating and transmitting, to a user capable of performing corrective actions, an alert indicating that the predefined child domain condition is violated;

executing a resolution system of procedure (RMOP) on the at least one child domain; and changing configuration parameters corresponding to at least one of the predefined parent domain condition and the predefined child domain condition.

15. The system of claim 9, wherein, based on determining that the node of the parent domain violates the predefined parent domain condition and prior to determining whether the node of the at least one child domain violates the predefined child domain condition, the at least one processor is further configured to execute the instructions to:

determine whether at least one child domain is interconnected with the parent domain that violates the predefined parent domain condition; and based on determining that no child domain is interconnected with the parent domain that violates the predefined parent domain condition, perform at least one corrective action on the parent domain that violates the predefined parent domain condition.

16. The system of claim 9, wherein the node of the parent domain comprises at least one of a router, an antenna, and a switch, and wherein the node of the at least one child domain comprises at least one of a router, an antenna, and a switch.

17. A non-transitory computer-readable storage medium storing instructions that, when executed by at least one processor, cause the at least one processor to:

determine whether a node of a parent domain violates a predefined parent domain condition;

based on determining that the node of the parent domain violates the predefined parent domain condition, determine whether a node of at least one child domain violates a predefined child domain condition, the at least one child domain being interconnected with the parent domain that violates the predefined parent domain condition;

based on determining that the node of the at least one child domain violates the predefined child domain condition, perform at least one corrective action on the at least one child domain; and based on determining that the node of the at least one child domain does not violate the predefined child domain condition, perform at least one corrective action on the parent domain that violates the predefined parent domain condition.

18. The storage medium of claim 17, wherein the parent domain comprises one of a radio access network (RAN) domain, a transport domain and a core domain, and wherein the at least one child domain comprises another of the RAN domain, the transport domain and the core domain.

19. The storage medium of claim 17, wherein the predefined parent domain condition is generated based on at least one key performance indicator (KPI) obtained from a performance management as a service (PMaaS) database.

20. The storage medium of claim 19, wherein the predefined parent domain condition is further generated based on at least one of:

fault alert information obtained from a fault management as a service (FMaaS) database; and configuration parameter information obtained from a configuration management as a service (CMaaS) database.

\* \* \* \* \*